Figure 1:
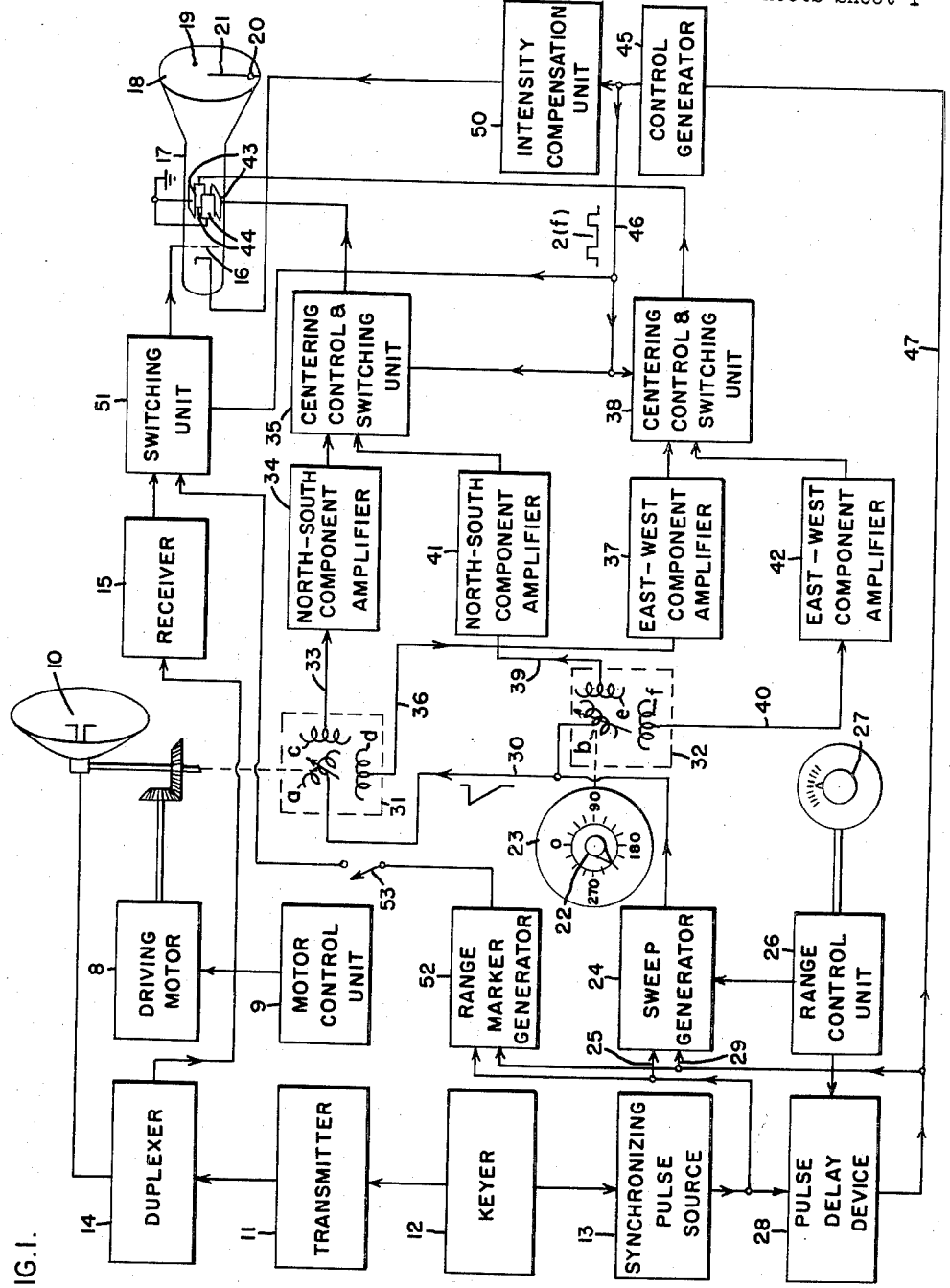

Jan. 31, 1961

W. B. WATSON 2,970,270

SWITCHING CIRCUIT

Original Filed March 14, 1952

3 Sheets-Sheet 1

INVENTOR:
WALLACE B. WATSON,

BY Delbert P. Warner
HIS ATTORNEY.

Jan. 31, 1961

W. B. WATSON 2,970,270

SWITCHING CIRCUIT

Original Filed March 14, 1952

3 Sheets-Sheet 2

INVENTOR:
WALLACE B. WATSON,

BY Delbert P. Warner

HIS ATTORNEY.

United States Patent Office 2,970,270
Patented Jan. 31, 1961

2,970,270
SWITCHING CIRCUIT

Wallace B. Watson, Clay, N.Y., assignor to General Electric Company, a corporation of New York Original application Mar. 14, 1952, Ser. No. 276,533, now Patent No. 2,797,411, dated June 25, 1957. Divided and this application Oct. 29, 1956, Ser. No. 620,569

3 Claims. (Cl. 328—58)

My invention relates to a switching circuit for providing a series of timed waveforms. More particularly, my invention pertains to such a switching circuit which may be used in a plan-position-indicator type of display system to provide timing waveforms which facilitate the determination of object or target bearing.

This application is a division of my application Serial No. 276,533, filed March 14, 1952, which was co-pending herewith and now has issued into U.S. Patent No. 2,797,411 which is assigned to the same assignee as the present invention.

It is an object of my invention to provide a source of timing pulses having leading edge portions concomitantly with the trailing edge of one sequence of pulses and having a duration substantially equal to the repetition period of a source of recurrent trigger pulses.

Another object of my invention is to provide a plan-position-indicator type display system featuring essentially all-electronic means for deriving a bearing-determining cursor of controllable orientation.

Yet another object of my invention is to provide a bearing-determining cursor for a plan-position-indicator by employing time-sharing of cursor sweeps and of target-indicating sweeps in a manner minimizing loss of target resolution resulting from such time-sharing.

A further object of my invention is to provide a cursor which may be controlled in its orientation for alignment with a given target indication to determine the bearing of the corresponding target and which may also be employed for a range measurement.

Briefly stated, a switching circuit in accordance with one aspect of my invention is adapted for inclusion in pulse-echo apparatus and comprises a control generator including a reference source of sine wave signal voltages coupled to a blocking oscillator condenser to produce thereon a waveform having a sine wave superimposed on a saw tooth wave of a longer period which may go above cutoff only during one half cycle of the sine wave every period of the saw tooth wave. When the charge on the condenser goes above cutoff, the oscillator is driven conductive and generates an oscillating wave of higher frequency than the sine wave. The output of the oscillator is coupled to one side of a first multivibrator to produce a square wave having a leading edge occurring substantially simultaneously with the output of the oscillator and a trailing edge occurring when the next pulse in a series of uniform period repetitive pulses is applied to the other side of the multivibrator. The output pulses of the multivibrator may be applied to a differentiating amplifier for producing an output pulse having a leading edge occurring substantially at the same time as the trailing edge of the square wave output of the multivibrator. The output pulses of the differentiating amplifier may then be applied to a second multivibrator to produce a square wave having a leading edge occurring substantially at the same time as the trailing edge of the first multivibrator. The trailing edge of this wave is determined by the next pulse in the series of uniform period repetitive pulses which is coupled to the second multivibrator to return it to its original state. The output of the second multivibrator may be coupled through a cathode follower to provide an output at the proper impedance level.

Figure 2:
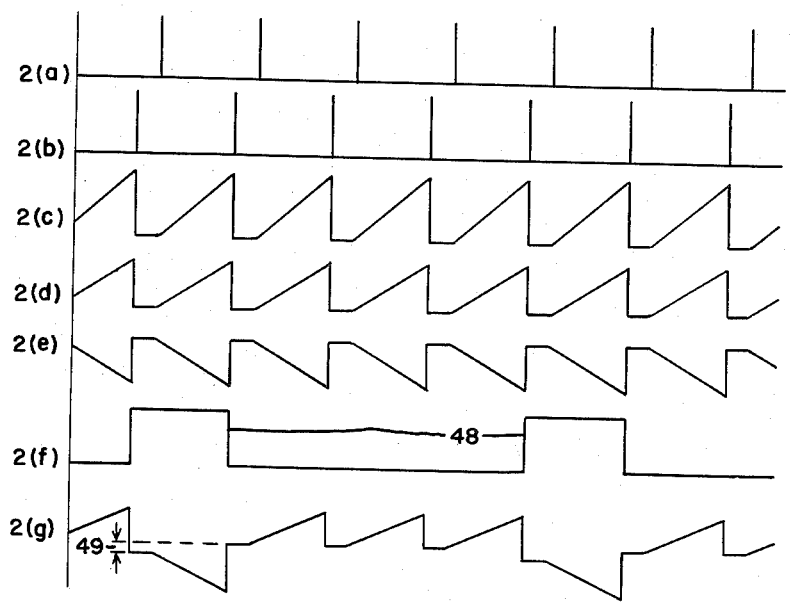
Figure 4:
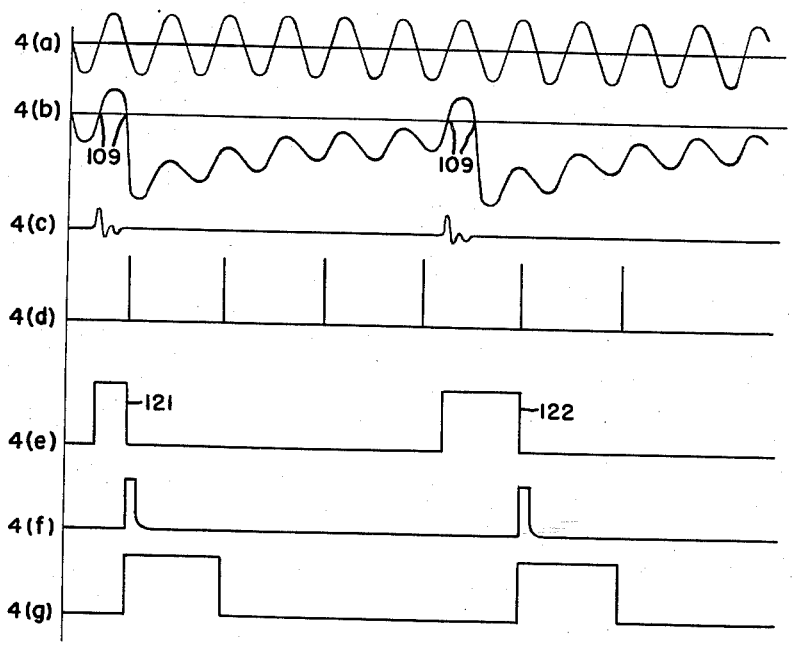
Figure 3:
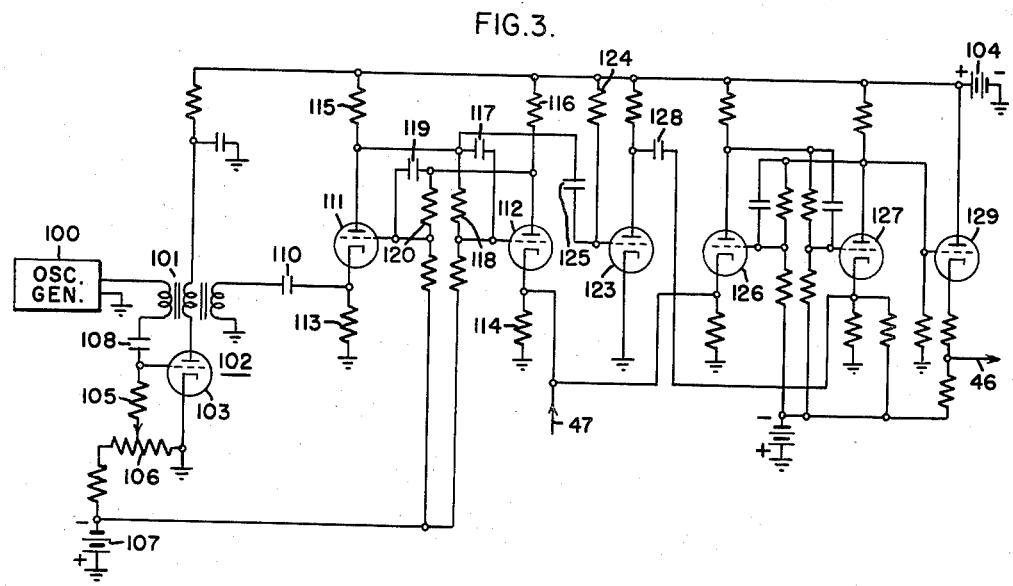

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which Fig. 1 represents a functional block diagram of a complete radar apparatus incorporating a display system in which my invention may be employed; Fig. 2 represents certain characteristics useful in explaining the operation of a portion of the apparatus shown in Fig. 1; Fig. 3 is a detailed schematic representation of a portion of the apparatus shown in Fig. 1 illustrative of one embodiment of my invention; and Fig. 4 represents various wave-forms characterizing the operation of the circuit illustrated in Fig. 3.

Referring now to Fig. 1 of the drawings, there is shown a directional antenna 10 to which pulses of radio-frequency energy having a frequency in the ultra-high frequency range are supplied by a transmitter 11 for radiation into space. This transmitter is controlled by a keyer 12, which provides pulses having a duration of, for example, one microsecond and may recur at a frequency from 50 to 2,000 cycles per second. The radiated pulses, which may be of the same duration, travel through space and may impinge upon a reflecting surface of an object and are thus returned toward the site of the radar apparatus for interception by antenna 10.

Received echo-pulses from the antenna are applied through a duplexer unit 14 to a receiver 15 for conversion from radio-frequency to video-frequency energy. Duplexer 14 may be of any suitable form serving to prevent damage and/or blocking of the receiver 15 during pulsing of transmitter 11. Moreover, the duplexer translates intercepted signals from antenna 10 to the receiver with substantially no attenuation.

Each of the elements, thus far described, may be of conventional construction, and detailed descriptions thereof are deemed unnecessary.

Antenna 10 is supported for rotation about a vertical axis, being driven by a motor 8 which is under the control of a motor-control unit 9, and its orientation during interception of target-reflected echoes represents the direction or bearing of the corresponding targets. In addition, as is generally well known, the travel time for a pulse in leaving and returning to antenna 10 represents the range of the reflecting target.

In order to display both range and bearing of a reflecting target, the video output signals from receiver 15 are supplied to control electrode 16 included in the electron-beam-deriving system of a cathode-ray type indicator tube 17 for controlling the intensity of the electron beam projected toward a viewing screen 18. Tube 17, of course, also is provided with means (not shown) to focus and accelerate the electron beam generated therein. At the same time, by means later to be described, the electron beam is deflected in response to a sawtooth sweep signal from the center of screen 18 toward its periphery in a direction corresponding to the orientation of antenna 10 about its vertical axis. More specifically, each sweep of the electron beam across screen 18 is initiated with radiation of a pulse by antenna 10 and proceeds at an adjustably fixed rate, which is selected so that the distance from the center of the screen to its outer periphery represents a given maximum range. Since returning echoes control the intensity of the electron beam, they are displayed on viewing screen 18 as intensified spots, such as 19 and 20, and a plan-position-indicator type display is presented on screen 18.

In order to facilitate the determination of target bearing, the receiver of Fig. 1 includes means, to be described in detail hereinafter, for developing a cursor 21 on viewing screen 18. The cursor is constituted of a radial trace or line on the viewing screen, and its position is under the control of a rotatable manual member 22 having a pointer, or index member, adapted to traverse a bearing scale 23. Accordingly, by manipulating member 22, the position of cursor 21 may be adjusted to intercept one of the target indications, such as spot 20 and the corresponding reading of scale 23 represents target bearing.

For developing the required sawtooth deflection voltages to provide the target and cursor displays, the receiver of Fig. 1 includes a sweep generator 24 which may comprise any well-known form of synchronizable means for deriving a highly linear sawtooth wave. Synchronizing pulses from a source 13, which are timed with the pulses generated by keyer 12, are applied to generator 24 via a lead 25. These pulses are represented by curve $a$ in Fig. 2. This Fig. 2 includes several curves illustrating the signal potentials at various points in the apparatus, plotted to a common time scale. The pulses from source 13 serve to control the initiation of each pulsation in the sawtooth wave developed by generator 24, and the slope of these pulsations is governed by a range control unit 26 having a manual adjustment 27.

A pulse-delay device 28, such as a delay multivibrator, also receives pulses from source 13 and, in response to the adjustment of unit 26, provides corresponding pulses delayed in time by an interval equal to the travel time for a selected maximum range. These delayed pulses, represented by curve $b$ in Fig. 2, are applied over a lead 29 to generator 24 and serve to terminate each sawtooth undulation.

Thus, each pulse or sawtooth of the wave developed by generator 24, which is represented by curve $c$ of Fig. 2, is initiated simultaneously with radiation of each transmitted pulse and is terminated simultaneously with the next following pulse of curve $b$. These sawtooth pulses have a duration which corresponds to the longest range from which echo pulses are to be displayed.

The sawtooth wave of curve $2c$ is supplied over conductor 30 to rotatable coil $a$ of an antenna bearing resolver 31 and to a rotatable coil $b$ of a cursor-control position resolver 32. Coil $a$ is mechanically coupled to antenna 10 for rotation therewith and coil $b$ is mechanically coupled for rotation with control 22.

The antenna bearing resolver also includes fixed coils $c$ and $d$ oriented at 90° relative to one another. It produces, for example at coil $c$, a sawtooth wave which, for a given position of antenna 10, may be represented by curve $d$ in Fig. 2. This sawtooth is synchronous with wave $2c$, but is of one polarity when the antenna is directed in a northrly direction and of the opposite polarity when the antenna is orientated in a southerly direction. In either case, the magnitude of the wave increases from zero as the antenna direction becomes more northerly or southerly from either a due east or a due west direction. This wave $2d$ from coil $c$ is supplied over a conductor 33 to an amplifier 34 and after amplification is supplied to a centering-control and switching unit 35, later to be described.

The antenna resolver 31 also produces at coil $d$ a corresponding sawtooth wave on conductor 36 which varies with respect to east and west in the same manner as does wave $2d$ vary with respect to north and south. This wave is amplified by an amplifier 37 and supplied to centering-control and switching unit 38, which is identical with unit 35.

The cursor-control position resolver 32 is identical with resolver 31, including fixed coils $e$ and $f$, but since its coil $b$ is mechanically coupled with manual control 22, the north-south component of the sawtooth wave derived at coil $e$ and applied to lead 39, and the east-west sawtooth component derived at coil $f$ and appearing at lead 40 are dependent upon the position of manual control 22 relative to the indicia of scale 23. The sawtooth wave at lead 39, which for a given position of control 22 may be represented by curve $2e$, is amplified in an amplifier 41 and thereafter applied to switching unit 35. Similarly, the sawtooth at lead 40 is amplified in amplifier 42 and applied to switching unit 38.

Thus, the north-south components of both the antenna and cursor-control resolvers are applied to unit 35, and these voltages are applied in selective alternation to the vertical deflection plates 43 of cathode ray indicator 17. Also, the east-west components of these resolvers are applied via switching unit 38 to horizontal deflection plates 44 of the indicator in selective alternation.

A control generator 45 is coupled to switching units 35 and 38 by a lead 46 and receives the delayed synchronizing pulses of curve $2b$ over a lead 47. It serves to generate a series of control pulses having a repetition frequency smaller than that of the signal from source 13 but of a duration corresponding essentially to the period of that signal. The pulse-type or square wave from generator 45 is represented by curve $2f$ and, as shown, it includes a series of pulses 48 which control the operation of switching units 35 and 38. During the intervals between pulses 48, the sweep voltages representing antenna bearing are applied to deflection system 43—44, whereas for the duration of each pulse, the cursor-control position sweep wave is applied thereto. For example, considering the north-south components alone of curves $2d$ and $2e$, during the intervals between pulses 48, the voltage represented by curve $2d$ is supplied to vertical deflection plates 43. However, during the occurrence of each of pulses 48, the voltage of curve $2e$ is applied and the composite resulting deflection wave is illustrated by curve $2g$.

As will be described more fully hereinafter, units 35 and 38 include centering-control means, and a static deflection field is provided for each of the cursor-control and target-indicating sweep signals. Consequently, the composite wave may exhibit a static potential displacement between the components corresponding to the sawtooth voltages shown by curves $2d$ and $2e$, such as represented by numeral 49 in curve $2g$.

To make visible a trace on screen 18, representing the cursor sweeps, an intensity compensation on unit 50, controlled by generator 45, supplies an electron beam-intensifying voltage to electron gun 16 during operating intervals wherein the cursor sweeps occur. This unit 50 alone may be of any well-known construction.

It is desirable to prevent intensity variations of trace 21 due to output signals from receiver 15. To that end, a switching unit 51 is interposed between the receiver output circuit and electrode system 16 of tube 17. Control pulses are supplied to the switching unit over conductor 46 so that the coupling circuit between the receiver and indicator is interrupted in response to each control pulse.

Unit 51 also serves to supply pulses from a range marker generator 52 which are available upon the selective closure of a switch 53. In this way, a series of spaced markers of greater illumination than the remainder of the trace define cursor 21 which thus may be employed for both bearing and range determination. Marker generator 52 is synchronized with the undelayed and delayed pulses available at leads 25 and 29, respectively, and alone may be of any well-known design.

As pointed out hereinbefore, the repetition frequency of the pulses from source 13 is under the control of the keyer 12, and hence, that frequency is subject to variation. Inasmuch as the repetition frequency of generator 24 is synchronized with that of source 13, a lesser number of sweeps per second are developed if, for any reason, it is required that the pulse repetition frequency be decreased. This tends to decrease the average illumination of viewing screen 18, and in order to avoid a decrease in resolution of target indications due to time-sharing of cursor and target sweeps, it is desirable to maintain the number of cursor sweeps per unit time at some low, minimum value. This function is aptly performed by a control generator 45, constructed in accordance with another feature of my invention, later to be described.

It will thus be seen that between pulses 48 of the curve 2f, the device 17 operates exactly as a plan-position-indicator. The ray is deflected radially from the center of the screen by each sawtooth wave from the sweep generator, and the radial direction of the sweep rotates over the surfaces of the screen as the antenna rotates about the horizon. The intensity of the ray is simultaneously modulated by received echoes to produce illuminated spots on the screen at positions corresponding to the location of objects from which such echoes are received.

During the pulses 48 this same operation occurs except that the direction of radial deflection of the ray from the center of the screen is determined, not by the position of the antenna 10, but by the position of the index member controlled by cursor control knob 22. Since this may be stationary the ray may be deflected in a single direction and a bright line 21 is produced across the screen in that direction. By rotating the knob 22 that line 21 may be rotated about the center of the screen in any desired direction.

This control of the trace, alternately by antenna 10 and cursor control knob 22, occurs at the frequency of the wave 2f, which is such that illuminated spots comprising the remote target indications and the cursor line 21 appear on the screen as a simultaneous and continuous presentation. Thus, by rotating knob 22 the line 21 may be moved to a position such that it traverses any remote object indication that may appear on the screen. This greatly facilitates the determination of the direction of the remote object from the equipment by inspection of the screen and scale 23.

Moreover, the pulses produced by the range marker generator 52 and supplied to the cathode ray tube through switching unit 51 produce bright spots along the cursor line at intervals corresponding to predetermined distances in space. By relating the position of a remote object indication to these bright spots the determination of the range to the object is determined, i.e., the cursor becomes a scale measuring the distance from the equipment to the remote object.

Referring to Fig. 3, this figure shows the details of the control generator 45, which operates to produce square wave pulses that are supplied over conductor 46 to control switching units 51 and the centering control switching units 35 and 38. These pulses are also supplied through unit 50 to the cathode of the cathode ray tube 17 to turn the ray in that tube off and on.

This generator comprises a reference source 100, which may be an ordinary sine wave oscillator of the power line, operating, for example, at 60 cycles. Output energy from generator 100 is supplied through one of the windings of a transformer 101 to a blocking oscillator 102. This oscillator comprises an electron discharge device 103 having a cathode connected to ground and an anode connected through a second winding of transformer 101 to the positive terminal of a source of operating potential 104. Its control electrode is connected through a resistance 105 to the variable tap of a potentiometer 106, the latter of which is connected in a circuit across a source of biasing potential 107, thereby to adjust the bias between the control electrode and cathode of device 103 in accordance with the adjustment of the potentiometer.

The transformer 101 couples the anode circuit of the device 103 to its grid circuit and is of such character as to render the circuit oscillatory, but owing to the accumulation of charge on a condenser 108 during one portion of the cycle of operation, the grid becomes sufficiently negative to interrupt anode current in device 103. In the following portion of the operating cycle, the charge of condenser 108 gradually leaks off, and the grid of device 103 is carried to a potential wherein anode current again flows to permit oscillations to take place. In other words, the oscillator blocks, or oscillates intermittently, and a sawtooth wave is generated on condenser 108.

The sine wave 4a (Fig. 4) from oscillator 100 is added to this sawtooth wave at the grid of device 103 to produce the wave represented by the curve 4b. During the intervals 109, when this combined wave drives the grid of the oscillator to a conducting condition, the oscillator operates and generates the pulses represented by curve 4c. It is inoperative during the time between the intervals 109. These pulses have a repetition frequency which is controllable by adjusting the tap of potentiometer 106. In this example, the pulses produced by blocking oscillator 102 have a repetition frequency equal to ⅙ that of the applied sine wave frequency. They are taken from the output winding of transformer 101 and are applied through a capacitance 110 to a multivibrator comprising electron discharge devices 111 and 112.

The cathodes of the two discharge devices 111 and 112 of the multivibrator are connected to ground through respective resistances 113 and 114. The anodes are connected to the positive terminal of the source of operating potential 104 through respective resistances 115 and 116. The anode of device 111 is connected to the grid of the device 112 through a condenser 117 in parallel with a resistor 118, and similarly, the anode of device 112 is connected to the grid of device 111 through a condenser 119 that is shunted by a resistor 120. Individual grid resistors connect the grids of these devices to the negative bias source 107.

Since the anode of each of devices 111 and 112 is connected by one of the resistors 118 and 120 to the grid of the other device, the multivibrator circuit has two stable-operating conditions, wherein one tube is conductive and the other is cut off. If, for example, a positive potential is applied to the grid-cathode circuit of the non-conductive device, or a negative potential is applied to the grid-cathode circuit of the conducting device, a change from one operating condition to the other is effected. Because the output circuit of each tube is effectively connected to the input circuit of the other, this action is regenerative and the change in operating conditions is almost instantaneous.

In this illustrative example of my invention, it is assumed that normally device 111 is conductive and device 112 is cut off. Pulses from blocking oscillator 102 are applied through condenser 110 to the cathode of device 111 and are of sufficient amplitude to drive the cathode momentarily in a positive direction with respect to the grid. Hence, any one of these pulses serves to decrease current in device 111 and, due to the resulting increase in anode potential, the grid of device 112 is driven positive relative to its cathode, and current flow is initiated in that device. The resulting decrease in anode potential of tube 112 further increases the grid-cathode voltage of device 111 in a negative sense and that device draws still less current. At the termination of this regenerative action, device 112 is conductive and device 111 is rendered non-conductive. This condition is maintained until the next following pulse is received over conductor 47 to drive the cathode of device 112 in a positive direction relative to its grid, whereupon the circuit is returned to the initially-assumed condition. Succeeding positive pulses at the cathode of device 112 have no effect because, in the initial state of the multivibrator, this device is cut off and nothing more occurs until a pulse from blocking oscillator 102 initiates another cycle of operation.

It is thus evident that each pulse of curve 4c (Fig. 4) alters the condition of conduction between tubes 111 and 112 from the initial state to an altered one, and the next succeeding pulse of curve 4d restores the initial state. Curve 4d is a reproduction of curve b of Fig. 2 and represents the pulses supplied by delay device 28 (Fig. 1) over conductor 47. In the initial condition of the circuit, the anode potential of device 111 has a low value, whereas this potential quickly increases when a change to the altered condition is effected. The increased potential is maintained until the circuit is returned to its initial state, and hence there is developed in the anode circuit of device 111 a pulse-type undulating output potential, such as represented by curve 4e. The leading edge of each pulse of curve 4e is concomitant with a pulse of curve 4c, and the trailing edge is defined by the next following pulse of curve 4d. Since, in this example, the sine wave of curve 4a is not synchronous with the sequence of pulses of curve 4d, successive pulses in the anode circuit of device 111 may not have the same duration, as illustrated by pulses 121 and 122 of curve 4e. Moreover, the period between these pulses may not be constant, although variations in the period are not very great.

Output pulses from the multivibrator are applied to a differentiating amplifier including an electron discharge device 123. The cathode of device 123 is grounded, its anode is connected to the positive potential source 104 through an anode load, and its control electrode is also connected to source 104 through a grid resistor 124 so that device 123 is normally highly conductive.

In order to apply output pulses from multivibrator 111—112 to amplifier 123, the grid of the amplifier is connected through a condenser 125 to the anode of tube 111. The respective resistance and capacitance values of elements 124 and 125 are selected, in a known manner, to differentiate electrically the applied undulating potential. In other words, in response to an applied pulse of positive polarity, there is developed at the grid of tube 123 a sharp positive pulse followed by a sharp negative pulse, which correspond to the leading and trailing edges, respectively, of the applied pulse.

The leading edge of the pulse (curve 4e) from the anode circuit of tube 111 causes a sharp positive pulse to be supplied to the grid circuit of tube 123, but since this tube is normally highly conductive, its anode current is not altered thereby. However, the negative pulse, corresponding to the trailing edge of the applied pulse, drives the grid-cathode potential in a negative direction and to the extent that anode current is interrupted for the duration of this pulse. As a result, a series of pulses, of positive polarity because of the usual phase inversion of an amplifier, are developed in the anode circuit of tube 123 and these pulses are represented by curve 4f.

The latter pulses are supplied to another multivibrator, including a pair of electron discharge devices 126 and 127 connected in a circuit like the one comprising tubes 111 and 112. In the normal state of multivibrator 126—127, tube 127 is conductive and the tube 126 is non-conductive. Each pulse of curve 4f is applied, via a coupling condenser 128, to the cathode of normally conducting tube 127, and since these pulses are of positive polarity, the conductive state of the multivibrator is changed in the same manner as described in connection with multivibrator 111—112. The next succeeding pulse (curve 4d) supplied to the cathode of tube 126 over lead 47, drives the cathode potential of this tube in a positive direction relative to its grid, and the initial set of conditions is obtained. Of course, since in its initial state tube 126 is cut off, succeeding pulses at its cathode have no effect and the cycle of operation is repeated with the occurrence of another pulse (curve 4f) from tube 123.

As a result of this alternation in conditions, the anode potential of tube 127 varies in pulse-fashion, as represented by curve 4g. The leading edge of each pulse is concomitant with each pulse of curve 4f and the trailing edge is determined by the next following pulse of curve 4d.

The anode of device 127 is directly coupled to the control grid of an electron discharge device 129, connected in a cathode follower circuit. Hence, the pulses produced in the anode circuit of tube 127 are supplied to the cathode follower, and since lead 46 is connected to the cathode circuit of this latter stage, control pulses, corresponding to those of curve 4g, are supplied to units 35, 38, 50, and 51 (Fig. 1). These pulses are the same pulses represented by curve 2f of Fig. 2.

Since the occurrence of each pulse of curve 4g is dependent solely upon the occurrence of a pulse of curve 4c, the period between successive ones of the first-mentioned pulses does not materially vary with a change in the repetition period of the pulses, represented by curve 4d. This means that, although the number of target-indicating sweeps per unit time produced on screen 18 (Fig. 1) may vary over a wide range, because the periods in which the cursor sweeps appear on the screen at times substantially dependent on the pulses of curve 4c, their number per unit time remains essentially unchanged, and target resolution is not impaired. Thus, by maintaining a constant average rate of application of cursor sweeps, which is independent of the recurrence rate of target indicating sweeps, and by insuring that each of the periods of application of the cursor sweeps is conditioned to replace only a predetermined number of the target indicating sweeps, applicant is able to achieve an improved composite form of display.

While I have shown a particular embodiment of my invention, I do not wish to be limited thereto since different modifications both in the circuit arrangement and in the instrumentalities employed may be made, and I contemplate by the appended claims to cover any such modifications as fall within the true scope and spirit of my invention.

What I claim as new and desire to secure by Letters Patent of the United States is:

1. In a system including a first source of a first sequence of trigger pulses having a first repetition period, a control generator comprising means for deriving a second sequence of trigger pulses having a second repetition period independent of and greater than said first period, a source of periodic waves having a third repetition period independent of said first repetition period, the output of said source being connected to said means to synchronize said second sequence of trigger pulses in reference to said periodic waves, a square wave generator coupled to said source and to said pulse and to said pulse-deriving means for producing a series of pulses having leading edge portions coinciding with consecutive ones of said second sequence of trigger pulses and trailing edge portions coinciding with non-consecutive ones of said first sequence of trigger pulses, and means coupled to said first source and to said square wave generator for deriving a series of output pulses for said generator having leading edge portions coinciding with said trailing edge portions of said first-mentioned series of pulses and each of said output pulses having a duration substantially equal to said first repetition period.

2. In combination, a source of control signals having a first repetition rate, first means for providing first pulses having a second repetition period independent of and greater than that of said control signals, a source of periodic waves having a third repetition period independent of said first repetition period, the output of said source being connected to said first means to synchronize said first pulses in reference to said periodic wave second means responsive to said control signals and said first pulses for providing second pulses having leading edge portions coinciding with consecutive ones of said first pulses and trailing edge portions coinciding with nonconsecutive ones of said control signals, third means responsive to said second pulses for providing third pulses coinciding with said trailing edge portions of said second pulses and fourth means responsive to said third pulses and to said control signals for providing fourth pulses having leading edge portions coinciding with said third pulses and having a duration substantially equal to the repetition period of said control signals.

3. In combination a first source of synchronizing pulses having a first repetition period, a second source of periodic waves having a second repetition period independent of said first repetition period, a free running pulse oscillator synchronized by said second source, a first multivibrator connected so as to be gated on by said pulse oscillator and cutoff by the output of said first source, a second multivibrator connected so as to be gated on by the output of said first multivibrator and cutoff by the output of said first source, output means connected to the output of said second multivibrator providing control pulses having a time duration equal to, and a recurrence frequency independent of, said first repetition period.

References Cited in the file of this patent
UNITED STATES PATENTS

| | | |
|---|---|---|
| 2,464,259 | Proskauer | Mar. 15, 1949 |
| 2,489,303 | Lyons | Nov. 29, 1949 |
| 2,515,613 | Schoenfeld | July 18, 1950 |
| 2,596,741 | Tyler et al. | May 13, 1952 |
| 2,636,984 | Canfora | Apr. 28, 1953 |
| 2,705,285 | Holland et al. | Mar. 29, 1955 |
| 2,797,403 | Woodruff | June 25, 1957 |
| 2,797,411 | Watson | June 25, 1957 |

UNITED STATES PATENT OFFICE
CERTIFICATION OF CORRECTION

Patent No. 2,970,270                                January 31, 1961

Wallace B. Watson

It is hereby certified that error appears in the above numbered patent requiring correction and that the said Letters Patent should read as corrected below.

Column 8, line 59, strike out "pulse and to said".

Signed and sealed this 13th day of June 1961.

(SEAL)
Attest:

ERNEST W. SWIDER                                  DAVID L. LADD
Attesting Officer                                      Commissioner of Patents